Sept. 29, 1964 C. F. HOWARD ETAL 3,151,262

DYNAMOELECTRIC MACHINE

Filed March 20, 1961

INVENTORS
CHARLES F. HOWARD
WILLIAM R. SCHULTZ
RALPH G. RHUDY

BY James R Campbell

United States Patent Office 3,151,262

Patented Sept. 29, 1964

3,151,262

DYNAMOELECTRIC MACHINE

Charles F. Howard, Scotia, William R. Schultz, Schenectady, and Ralph G. Rhudy, Scotia, N.Y., assignors to General Electric Company, a corporation of New York Filed Mar. 20, 1961, Ser. No. 97,104
7 Claims. (Cl. 310—260)

The invention described herein relates to dynamoelectric machines and particularly to a motor capable of use under varied and demanding environmental conditions.

Present preferred constructions of random wound motors include windings disposed in a magnetic core and comprising magnet wire having a thin insulating film disposed on its outer surface for providing the dielectric barrier necessary for motor operation. Such magnetic cores usually are additionally equipped with multiple layers of varnish over both the iron of the core and the windings which serves to fill any pinholes in the insulating film and bonds the multitude of end turn conductors together into a substantially rigid mass. Limited protection of an electrical, mechanical and chemical nature therefore is provided.

During manufacture individual end turn conductors sometimes project slightly outward from the main mass of an end turn to present a high spot in that area. When the multiple layers of varnish are applied, surface tension limits establishment of a uniform varnish coating over the high spots on the projecting conductor. As a result, the conductor sometimes does not receive the full benefits intended to be furnished by the multiple varnish dips.

The excellent insulating characteristics of the insulation however, in addition to its toughness and freedom from flaws, makes it highly desirable for use in motor and generator applications. However, when the insulating film which may comprise a resinous composition is subjected to severe thermal cycling of a motor over an extremely long period of time, the insulation tends to become brittle and develop minute cracks along the length of the conductors which comprise the winding. Continued use then in an environment having high moisture content or when the atmosphere is highly laden with corrosive materials, may cause breakdown of the insulation at the areas of the flaws or cracks with consequent damage to the machine.

Alternative insulating systems wherein the conductors are equipped with a serving of insulation, such as cotton or other fibrous material, may be applied to the surface of the insulated conductor but this kind of construction increases substantially the over-all dimensions of the winding in the slots, thereby requiring a larger size magnetic core to handle the larger size slots necessary for accommodating the insulating wire with the serving thereon.

Moreover, in the winding region outside the magnetic core, the present types of windings contain void or dead air spaces between the adjacent conductors such that the heat dissipation properties of the machine are restricted. Probably more important, the insulated conductors comprising the end turns move when the motor is subjected to magnetic and mechanical vibratory forces, and as a consequence, the insulation on adjacent conductors may be rubbed off by friction, thereby providing short circuits which cause severe damage to the machine. Efforts have been made to fill the interstices thus formed by the insulated conductors by resorting to multiple varnish dips as mentioned above, but embrittling of the insulation still occurs.

Still another problem presented by the use of resinous films on the end turn surfaces arises when the machine is operated in an environment wherein the air is laden with gritty-like particles, such as found in cement plants. The abrasive action of the particles impinging on the insulated surfaces in time causes deterioration of the resinous composition.

It therefore is apparent that the need exists for an improved construction for making possible the application of a random wound motor to environmental conditions more stringent than that now possible by present motors, particularly open motors.

The primary object of our invention therefore is to provide a physical re-enforcement as an integral part of an insulating film on winding end turns to obtain improvement in the motor space factor.

Another object of our invention is to provide an improved construction for resisting the cracking of resinous insulation on the wire by employing a mechanical re-enforcement placed in contact therewith.

A further object of our invention is to provide a larger build of insulation on end turn conductors by utilizing a relatively few number of treatments with a resin of low viscosity which also serves to fill the intersticial areas of the winding end turns.

In carrying out our invention, we wind the stator of a random wound motor with insulated magnet wire in the usual manner and then dip the complete magnetic core in a bonding resin for filling the interstices and bonding the multitude of magnet wire conductors into a unified mass. A cure at a temperature to obtain complete setting of the resin may follow. In those instances where the bonding coat is cured to completeness, the stator core is then subjected to a second resin dip and while tacky, the end turn surfaces are flocked with fine glass strands which become embedded in and adhere to the tacky insulated surface. These steps may be repeated depending on the degree of build which is required for the particular machine. Additional resinous dips, each followed by curing preferably are then carried out in order to provide a smooth surface resistant to the deposition of foreign particles. In a modification, the end turn surfaces insulated in the above manner may be furnished with an additional encapsulating medium, such as silicone rubber or a thixotropic resin for providing a smooth exterior surface resistant to contaminants and to damage by impinging abrasive particles.

While the specification concludes with claims particullarly pointing out and distinctly claiming the subject mater which we regard as our invention, it is believed the invention will be better understood from the following description taken in connection with the accompanying drawing wherein:

Figure 2:
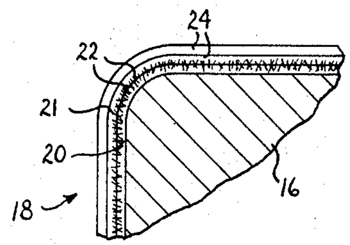
FIGURE 2 is an enlarged view in elevation of an end of a conductor used in the motor of FIGURE 1 illustrating the disposition of insulation on the winding.

Referring now to the drawings wherein like reference characters designate like or corresponding parts throughout the several views, there is shown a magnetic core 10 for a dynamoelectric machine comprising a plurality of laminations 12 having internally disposed slots 14 for receiving a random wound winding 16 constituted of a multiplicity of single conductors insulated with a resinous composition in the usual manner. The winding end turns project outwardly from both ends of the stator core and because of the design and disposition of the conductors, a multitude of void or dead air spaces of varying size appear between the conductors. The magnetic core thus described is no different than those which presently are made by electrical manufacturers.

Those portions of the conductors in the slots of the motor are spaced from the iron of the core by slot liners and are insulated in a manner well known in the art. This invention, however, is directed to encapsulation of the end turns projecting outwardly from the stator core. Generally, a plurality of layers of insulation 18 are disposed thereon in addition to the turn insulation on the conductors. Each of these layers consist of a bonding and/or priming coating of insulation 20 with an overcoating of flock 22 preferably comprising glass strands of about .030"–.040" long and a diameter of approximately .0002"–.0005", but other dimensions may be used as more fully described hereafter. Additional layers of resin and flock may then be added according to the degree of build desired on the end turn surfaces. A sealing coat of a resinous composition 24 only may then be applied for furnishing a smooth surface resistant to the deposition of foreign particles. The sealing coating also may comprise a thixotropic resin. A final layer of rubber 26 may then be applied to the insulated conductor if desired.

Considering more specifically now the actual embodiment used for illustrating the invention, after the core is wound with a random winding 16, it preferably is heated to approximately 110° C. The heated core with its winding is then dipped in a resinous composition 20, preferably an epoxy resin identified as General Electric No. 74001. This is a bonding resin whose viscosity is relatively low such that it can completely penetrate and permeate all the void spaces which appear between adjacent end turn conductors. Its flowable and wetting characteristics make it bond adjacent conductors to each other.

When complete impregnation is accomplished, the core with its deposit of epoxy resin thereon is subjected to a temperature for curing the resin. When cured, the resin bonds all the end turn conductors together tightly, thus making the mass of conductors relatively rigid and preventing the individual conductors from moving with respect to each other. Therefore no likelihood will exist for the insulation to be rubbed off the adjacent conductors by friction.

The stator core with its cured bonding coat is then dipped in a priming resin, which when left in an uncured state, provides a tacky surface especially suitable for reception of flock which is supplied subsequently. The resin preferably should have the same characteristics as the bonding resin in order to obtain complete wetting of the exposed insulated conductor surfaces. Both the bonding and priming resins must of course be compatible with each other and with the insulating film on the conductor and produce no adverse effects when in either an uncured or cured state. In addition to remaining tacky, the resin preferably should not surface dry. It should have freedom from porosity, contain good wetting characteristics and not flow when subjected to curing temperatures. The dielectric film thus formed should be smooth, uniform and free of holes, be resistant to abrasion, crack propagation and have good chemical and moisture stability.

In lieu of carrying out this last step of providing a priming coat over the resin furnished by the bonding dip, the bonding dip resin may be left in an uncured state so that flock may be sprayed on the tacky surface.

Regardless of whether the bonding or priming coating of insulation is used, the surface presented at this time should be tacky. Flock comprising glass strands of the type identified above is then sprayed, blown or otherwise deposited on the tacky surface of the end turns until they present an appearance which is substantially white, the same color as the glass. Since the resinous coating displays adhesive characteristics and has thickness, the flock readily becomes embedded in and clings to the tacky surface of the end turns especially when applied under a force, as with air at slightly elevated pressures. Uniformity of flock application is desirable and it is preferable to deliberately apply a heavy coating near the slot tube and round those portions of the conductors where connections are made.

The stator treated in this manner is then heated to 150° C. for approximately one hour for curing the resin. Many different types of resin may be used and the above temperature and time period therefore may vary in accordance with the particular resin characteristics. The objective however is to obtain curing of the resinous composition. The core then may be reduced to room temperature. The above steps, except for the bonding dip, may be repeated to obtain the desired degree of build on the end turn surfaces.

The primary function of the flock is to furnish a mechanical re-enforcement for the resin beneath the flock and those layers of insulation later applied as outer coatings thereover. These may be the resins of additional varnish dips, thixotropic resins, silicone rubber, or any other outer coating. It therefore protects the electrically energized components in the machine from the environment in which it operates. The action obtained is very similar to that performed by cement and steel in re-enforced concrete. The build of resin-flock material not only minimizes cracking of the base layer of insulation on the conductors but also imparts considerable tensile strength to the complete end turn mass. Another function of the flock is that of providing a matrix which presents a greater surface area on which greater amounts of resin and flock can be deposited when additional layers are needed.

In order to provide a smooth outer surface on the end turns which is resistant to abrasion from foreign particles, the complete core may be dipped in a sealing resin 24 which seals the entire end turn area. It is particularly effective in presenting a glassy-like exterior surface on which it is difficult for foreign particles to adhere while simultaneously also contributing to the dielectric and mechanical strength of the systems. The kinds of resins which may be used for this purpose are identified as General Electric No. 9801 or 9700, for example. A suitable resin found especially effective is a formulation having the following specifications and properties. It comprises (*a*) 100 parts of a liquid epoxy resin having an epoxide equivalent of 180–195, a viscosity at 25° C. in Gardner-Hodt poises of 100 to 160 and sterification value of 85. Sterification is defined as grams of resin required for complete reactance with 1 gram-mole of a mono-basic organic acid; (*b*) 20 parts of a resin sold under the trademark Cardolite which is fully disclosed in U.S. Patent 2,891,026 and (*c*) 3 parts of boron trifloride monoethylamine. It will be evident that the sealing dips may be omitted if desired.

The bonding resin may comprise any one of a number of different types of resins commercially available. Such resins may be epoxy, polyester, phenolic, polyurethanes, or any one of a number of others, so long as they contain the characteristics identified above. We have found that an amine catalyzed epoxy resin solution such as General Electric No. 74001 contains the necessary attributes for this purpose.

The priming resin which may be applied over the bonding layer may also comprise the same resin as that stated in the preceding paragraph.

Preferably, the flock should be glass strands of the type mentioned above. Alternatively strands of dacron, nylon, cotton, asbestos, or other materials capable of being finely divided into the approximate dimensions previously mentioned may be employed. The best results have been obtained by spraying glass on the tacky end turn surfaces by using air as a vehicle.

Figure 3:
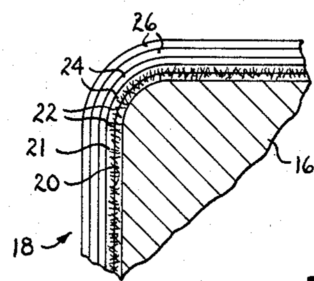
FIGURE 3 is a modification the same as FIGURE 2 but including an additional layer of insulation.
Figure 1:
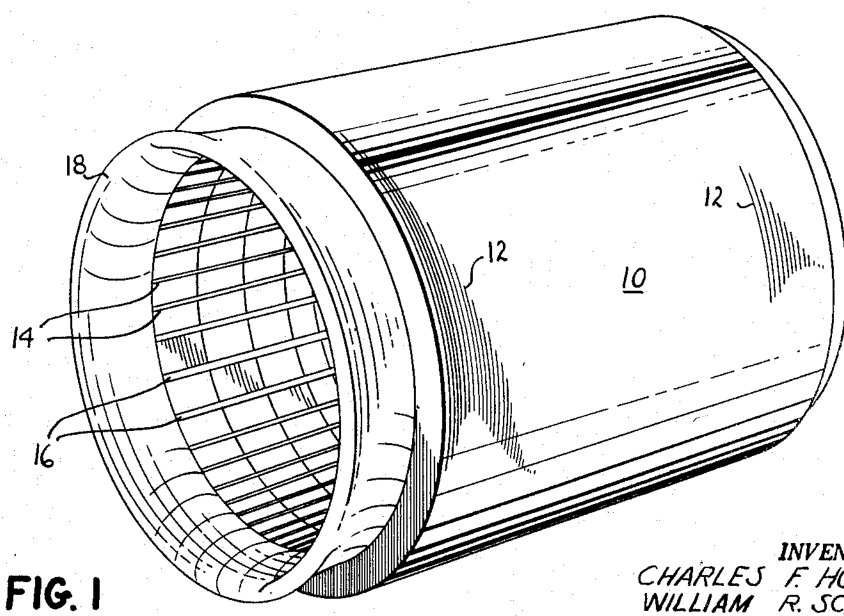
FIGURE 1 is a perspective view of a random wound motor having the end turns encapsulated in accordance with the teachings of our invention.

The modification shown in FIGURE 3 illustrates the application of a rubber type of material as an overlayer on the flocked end turn surfaces. This material may or may not contain a filler for improving the heat dissipation characteristics of the machine.

The rubber can be applied as a dip, spray or paste to the flocked surfaces to form a smooth glassy finish resistant to the deposition of foreign particles. We have found that silicone rubber is suitable for the application. It is desirable to first prime the resinous surface before the application of silicone rubber. An agent useful for this purpose which permits the rubber to wet and bond to the resinous surface is identified as General Electric No. XS-4004. It will be apparent that other types of rubber materials may be used, such as butyl rubber.

Tests have been performed on stators having a silicone rubber overcoating on flocked end turn surfaces of the type described above. They show that when operated in a high moisture environment with periodic application of electrically conducting contaminants for pointing out flaws and fissures, that the performance of the motor of this invention, as far as life expectancy is concerned, was between 1.5 and 3 times that of a standard motor of the same type.

It will be apparent that in view of the teachings herein, that the invention may be applied with success to other electrical or non-electrical components. Examples of such use are insulating the field poles of both synchronous and direct current motors and generators or in other applications wherein the surfaces of coils or windings are exposed and can be encapsulated. Application of these teachings to objects wherein it is desired to protect a surface by a mechanically reinforced coating is obvious.

In view of the above, it will be evident that many modifications and variations are possible in light of the above teachings. It, therefore, is to be understood that within the scope of the appended claims, the invention may be practiced other than as specifically described.

What we claim as new and desire to secure by Letters Patent of the United States is:

1. A dynamoelectric machine comprising a stator core having an insulated random winding therein, end turns on the winding extending outwardly from the core, the improvement comprising an initially viscous resinous composition in the void spaces between adjacent end turn conductors comprising the winding, a layer of insulation having a solid material thereon coated on the end turns for imparting tensile strength to the insulated conductors, and at least one overlayer of insulating material for furnishing a smooth outer surface on the end turns.

2. A dynamoelectric machine comprising a stator core having an insulated random winding therein, end turns on the winding extending outwardly from the core, the improvement comprising an initially viscous resinous composition in the void spaces between adjacent end turn conductors, a layer of insulation comprising a resin over said resinous composition, a solid material having lengthwise dimensions of between .030"–.040" and a diameter of approximately .0002"–.0005" in direct contact with and bonded to said resinous composition, and a sealing resin thereon for providing a smooth surface resistant to the deposition of foreign particles.

3. The combination according to claim 2 which includes a layer of rubber completely encapsulating said end turn surfaces.

4. The combination according to claim 3 wherein the layer of rubber comprises silicone rubber.

5. A dynamoelectric machine comprising a stator core having an insulated random winding therein, end turns on the winding extending outwardly from the core, the improvement comprising a base coating of resin encapsulating said end turns and in the void spaces in the end turn surfaces for forming a bond between adjacent conductors, an overlayer of resin on said base coating, strands of small size completely encompassing and adhering to the resin, and at least one overlayer of a resinous composition on said strands for minimizing the establishment of cracks in the insulation on the conductor and imparting great tensile strength to the end turn portions of the winding.

6. A dynamoelectric machine comprising a stator core having an insulated random winding therein, end turns on the winding extending outwardly from the core, the improvement comprising a base coating of insulating material encapsulating said end turns, a substance on said insulating material for imparting tensile strength thereto and for minimizing the possibility of cracking of the insulation when the machine is placed in operation, and an encapsulating overlayer on the coating of insulating material and said substance positioned thereon.

7. A dynamoelectric machine comprising a stator core having an insulated random winding therein, end turns on the winding extending outwardly from the core, the improvement comprising a base coating of insulating material encapsulating said end turns, a substance on said insulating material for imparting tensile strength thereto and for minimizing the possibility of cracking of the insulation when the machine is placed in operation, and an encapsulating overlayer of silicone rubber on the coating of insulating material and said substance positioned thereon.

References Cited in the file of this patent

UNITED STATES PATENTS 2,837,669 Fisher et al. ----------- June 3, 1958
2,961,555 Towne ---------------- Nov. 22, 1960

OTHER REFERENCES

Publication of Journal of Institute of Electrical Engineers, by J. Ashmore, vol. 5, No. 60, December 1959, pages 695–699.